United States Patent [19]

Masamichi

[11] Patent Number: 5,714,951
[45] Date of Patent: Feb. 3, 1998

[54] METHOD AND APPARATUS OF REPRODUCING DIGITAL DATA

[75] Inventor: Furukawa Masamichi, Hamamatsu, Japan

[73] Assignee: Yamaha Corporation, Hamamatsu, Japan

[21] Appl. No.: 401,082

[22] Filed: Mar. 8, 1995

[30] Foreign Application Priority Data

Mar. 11, 1994 [JP] Japan .................. 6-067561

[51] Int. Cl.$^6$ .................................................. H03M 7/00
[52] U.S. Cl. .................................................. 341/94
[58] Field of Search ........................... 341/155, 94, 106

[56] References Cited

U.S. PATENT DOCUMENTS 4,649,421  3/1987  Kodama et al. .................. 358/51
5,457,457  10/1995  Hayashi .

FOREIGN PATENT DOCUMENTS 466190  1/1992  European Pat. Off. .
481626  4/1992  European Pat. Off. .

OTHER PUBLICATIONS

European Search Report dated, Nov. 23, 1994, Application No. 95103265.5.

Toshihiko Masuda, et al., "The Highest Precision D/A Converter Device For Digital Audio", IEEE, Jun. 12, 1992.

*Primary Examiner*—Brian K. Young
*Attorney, Agent, or Firm*—Loeb & Loeb LLP

[57] ABSTRACT

Relationships between amplitude patterns, each being composed of a train of a predetermined number of samples including a target sample, and correction values corresponding to quantizing errors of the target samples are obtained in advance from a relationship between a plurality of samples of the same amplitude pattern and actual amplitude values of their target samples. Each of the sample values of inputted digital data is corrected by a correction value corresponding to an amplitude pattern specified by the sample values around such sample value to be corrected. As a result of this operation, a correction value consisting of a few bits is added to the lower of the LSB of the digital data, thereby reducing quantization noise of the digital data.

17 Claims, 10 Drawing Sheets

FIG. 5

| NO | CORRECTION VALUE | OCCURENCE | NO | CORRECTION VALUE | OCCURENCE |
|---|---|---|---|---|---|
| 1 | 5.55 | 128,621 | 33 | 3.54 | 388 |
| 2 | 0.00 | 106,625 | 34 | 4.29 | 377 |
| 3 | 6.47 | 92,716 | 35 | 1.28 | 224 |
| 4 | 5.54 | 74,732 | 36 | 3.49 | 215 |
| 5 | -6.96 | 58,639 | 37 | 5.82 | 201 |
| 6 | 6.27 | 54,611 | 38 | 4.48 | 172 |
| 7 | -0.10 | 48,461 | 39 | -0.90 | 163 |
| 8 | -2.70 | 40,829 | 40 | -4.60 | 149 |
| 9 | -1.91 | 39,746 | 41 | -6.12 | 141 |
| 10 | 0.40 | 17,146 | 42 | 1.53 | 139 |
| 11 | 1.65 | 13,343 | 43 | 1.97 | 138 |
| 12 | -4.22 | 11,225 | 44 | -3.32 | 129 |
| 13 | 2.35 | 6,476 | 45 | 1.70 | 124 |
| 14 | 3.43 | 5,740 | 46 | -5.37 | 106 |
| 15 | 5.63 | 4,478 | 47 | -1.94 | 81 |
| 16 | 3.40 | 4,125 | 48 | -3.33 | 80 |
| 17 | 0.00 | 3,533 | 49 | 2.30 | 77 |
| 18 | -2.56 | 3,505 | 50 | 2.06 | 74 |
| 19 | -0.05 | 3,242 | 51 | -0.72 | 74 |
| 20 | -4.70 | 3,104 | 52 | -0.76 | 63 |
| 21 | 2.58 | 2,687 | 53 | -2.57 | 56 |
| 22 | -4.42 | 2,672 | 54 | 2.33 | 41 |
| 23 | 5.61 | 2,169 | 55 | -3.75 | 40 |
| 24 | 5.48 | 1,794 | 56 | -3.07 | 31 |
| 25 | -5.60 | 1,280 | 57 | 2.11 | 29 |
| 26 | -5.57 | 1,243 | 58 | -2.69 | 23 |
| 27 | -5.86 | 815 | 59 | 3.93 | 15 |
| 28 | -2.05 | 772 | 60 | -1.91 | 12 |
| 29 | 6.60 | 696 | 61 | -3.32 | 9 |
| 30 | 3.17 | 654 | 62 | -2.78 | 5 |
| 31 | 1.72 | 620 | 63 | -3.00 | 3 |
| 32 | -4.01 | 410 | 64 | 7.00 | 1 |

TOTAL OCCURENCE 740,089

±1/2 LSB

METHOD AND APPARATUS OF REPRODUCING DIGITAL DATA

BACKGROUND OF THE INVENTION

The invention relates to a method and apparatus of reproducing digital data which effectively removes quantization noise by extending the number of bits of a piece of digital data prior to digital-to-analog (D/A) conversion while correcting individual pieces of sampled data of digital audio signals and the like.

Apparatuses such as CD players, MDs (mini disks), DCCs (digital compact cassettes), and electronic musical instruments, which process audio signals in the form of digital data suffer from the problem of noise caused by quantizing error. In the case of quantization using a 16-bit code, the quantizing error of a signal of comparatively large amplitude is not so noticeable. However, as shown in FIG. 12A, if a sinusoidal signal (500 Hz) whose level is as small as about −76 dB is quantized using a 16-bit code at a sampling frequency fs of 40 kHz, the effective bit length is equal to 4 bits or so as shown in FIG. 12B, and signals in the range of ±½ LSB are all rounded. Therefore, the waveform of the signals after D/A conversion is so distorted in the form of steps as shown in FIG. 12C even if passed through a 20-kHz interpolation filter. Such a rounding error, corresponding to the through rate of the signal, occurs even at large amplitude levels as the frequency range becomes lower. Therefore, such quantization noise becomes objectionable when introduced into an audible frequency range.

There has been no technique for removing a stepped quantization noise component of this type. A system for smoothly interpolating between samples by over-sampling inputted digital data cannot remove rounding errors of the inputted sampled data themselves.

Disclosed to overcome this problem is a system for extending the number of bits to 20 bits or so by detecting a point at which pieces of continuous data of the same level change only by one LSB in the aforementioned stepped waveform, linearly estimating data from a first point of change by the LSB to a next point of change by the LSB, and adding estimated correction data consisting of some bits to each of the 16-bit original sampled data. As a result of this system, the original for sampled data themselves between both points of change are corrected, so that the waveform before D/A conversion can be reproduced into a waveform close to the actual waveform.

However, in the aforementioned conventional digital data reproducing method, the correction data between a first point of change by the LSB and a next point of change by the LSB are limited to predetermined patterns, which in turn imposes a problem that reproducible patterns are limited to predetermined waveforms such as a sinusoidal waveform.

In addition, the conventional method corrects a portion of data whose LSBs are continuous in the same level as a group. Therefore, naturally produced individual sample values of various levels cannot be corrected, which hence does not lead to an effective reduction in quantization noise.

SUMMARY OF THE INVENTION

The invention has been made to overcome these problems. Accordingly, the object of the invention is to provide a method and apparatus of reproducing digital data which can be applied to a diversity of waveform patterns and which can correct individual pieces of sampled data finely to thereby reduce quantization noise effectively.

The invention is applied to a method of reproducing digital data characterized in that a relationship between an amplitude pattern composed of a train of a predetermined number of samples including a target sample and a correction value corresponding to a quantizing error of the target sample is obtained in advance from a relationship between a plurality of samples of the same amplitude pattern and actual amplitude values of target samples thereof; that the correction value is calculated based on the amplitude pattern being specified by letting each of samples constituting inputted digital data be a target sample; and the corrected value is added to the right of the LSB of each piece of the inputted digital data, so that digital data with reduced quantizing error can be reproduced.

The invention is also applied to a digital data reproducing apparatus comprising: a means for extracting an amplitude pattern composed of a train of a predetermined number of samples including a target sample from inputted digital data; a means for outputting a correction value by inputting the amplitude pattern extracted by the amplitude pattern extracting means, and outputting a correction value corresponding to the inputted amplitude pattern based on a relationship between the amplitude pattern and a correction value corresponding to a quantizing error of the target sample obtained in advance from a relationship between a plurality of samples of the same amplitude pattern and actual amplitude values of target samples thereof; and a means for correcting the target sample by adding the correction value outputted from the correction value outputting means to the right of the LSB of the target sample of the inputted digital data.

A signal exhibiting a certain tendency other than random noise such as an audio signal allows a sample value at an arbitrary point to be estimated to some extent from an amplitude pattern around such sample of interest. The estimated value can be obtained by sampling a plurality of the same amplitude patterns and subjecting the obtained samples to a statistical analysis or the like.

The invention is characterized as obtaining a relationship between an amplitude pattern composed of a train of a predetermined number of samples including a target sample and a correction value corresponding to a quantizing error of the target sample in advance as described above, and then calculating a correction value of each sample value of inputted digital data from an amplitude pattern around such sample to be corrected.

According to the invention, each individual sample can be corrected finely based on the amplitude pattern around such sample to be corrected, which in turn leads to an effective quantization noise reduction.

In addition, according to the invention, correction values are prepared for all possibly expected amplitude patterns. Therefore, sampled data can be corrected accurately for a variety of amplitude patterns. Further, if the relationship between amplitude patterns and correction values is obtained every kind of digital data to be inputted as the case may so require, more accurate correction values can be found. Still further, the number of necessary patterns can be curtailed by limiting the patterns to be prepared in advance to only those that are audibly affecting.

BRIEF DESCRIPTION OF THE DRAWINGS

FIG. 5 is a table showing relationships among the amplitude patterns, the quantizing errors, and the quantizing error occurrence frequencies;

DETAILED DESCRIPTION OF PREFERRED EMBODIMENTS

Preferred embodiments of the invention will now be described with reference to the accompanying drawings.

The concept of the invention will be described first with reference to FIGS. 1 to 7B.

Figure 1A:
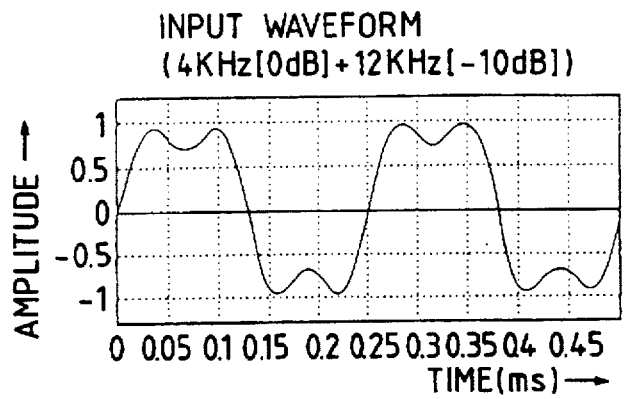
FIGS. 1A to 1D are diagrams illustrative of a rounding error produced in a small signal.
Figure 1B:
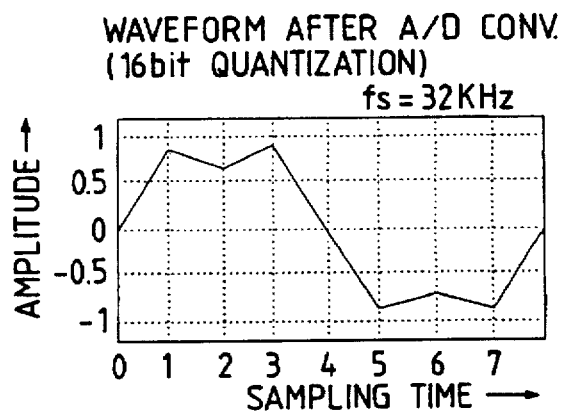
Figure 1C:
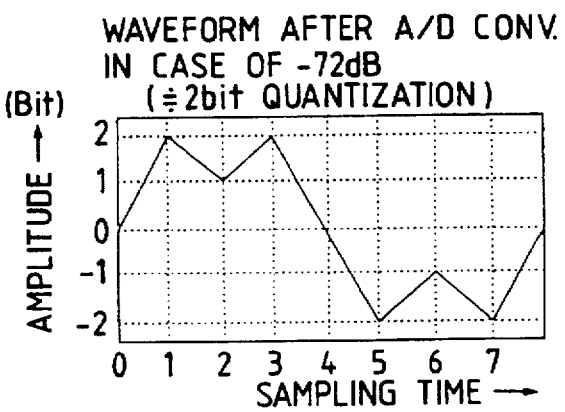
Figure 1D:
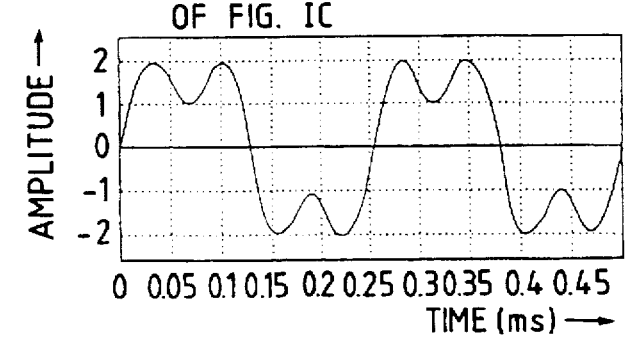

If an input signal is obtained by synthesizing a 4-kHz (0 dB) sinusoidal signal and a 12-kHz (−10 dB) sinusoidal signal such as shown in FIG. 1A and such input signal is quantized using a 16-bit code at a sampling frequency fs of 32 kHz, then such a train of sampled data as shown in FIG. 1B can be obtained. On the other hand, if the input signal of FIG. 1 is replaced with a −72 dB signal and such signal is quantized under the same conditions, then such a sampled data train corresponding to that obtained by a quantization using a 2-bit code as shown in FIG. 1C can be obtained. This means that rounding error is no longer neglected. When such sampled data train as shown in FIG. 1C is subjected to D/A conversion directly, the reproduced waveform becomes quite different from the original waveform (FIG. 1A) as shown in FIG. 1D.

To overcome this shortcoming, the respective samples containing rounding errors are corrected as shown in FIG. 2.

In this example, the amplitudes of a total of five continuous samples including a target sample to be corrected, and two samples before and after the target sample, are patterned into amplitude patterns. If the amplitude of a target sample is assumed as zero, the amplitude pattern of sample (1) in FIG. 2A corresponding to pattern (1) of FIG. 2B. In terms of the amplitudes of the respective samples with respect to the target sample, pattern (1) can be expressed as [−4, −2, 0, −1, 0]. In terms of the differences from the previous samples, pattern (1) can be expressed as (2, 2, −1, 1). The former will hereinafter be referred to as the absolute expression of an amplitude pattern and the latter to the relative expression of an amplitude pattern.

Figure 2A:
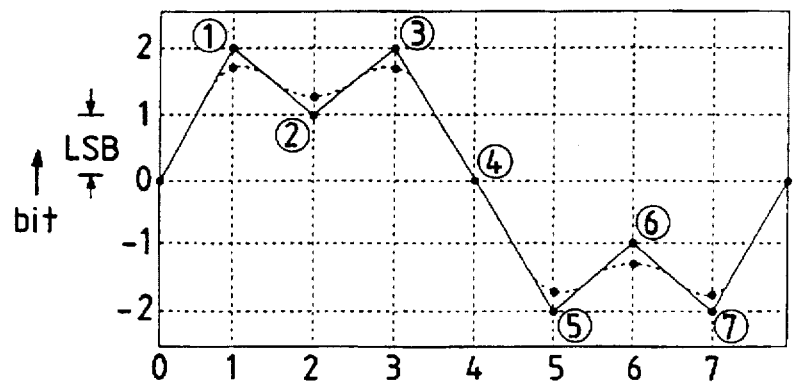
FIGS. 2A and 2B are diagrams illustrative of how respective sample values of original sampled data are corrected in accordance with amplitude patterns.
Figure 2B:
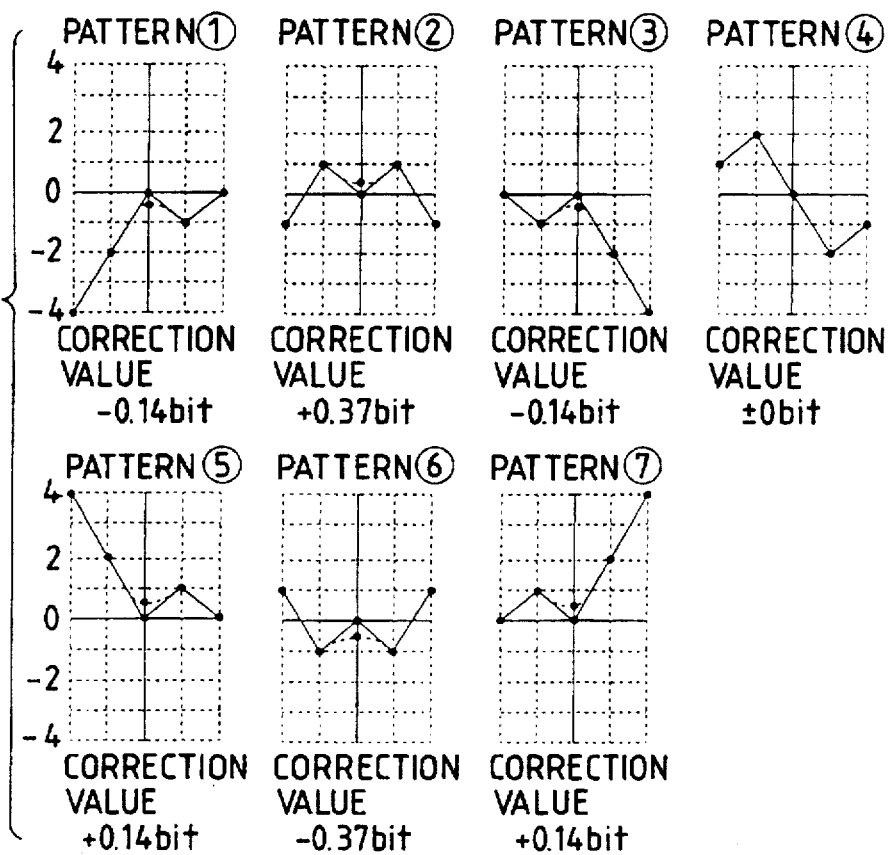

In the case of pattern (1), a point of passage of the target sample as a correct signal waveform is as defined by a dashed line in FIG. 2B. The distance between the sample value of the target sample and the actual amplitude level is −0.14 bit. This "−0.14 bit" is added to the sample value of the target sample (1) as a correction value. If 3 bits data are added to the lower of the LSB of the sample as a correction value, −0.14 bit is corresponding to "−001". Therefore, the 16-bit sampled data can be extended to 19-bit data by 3 bits of correction value.

Similarly, when samples (2), (3), . . . , (7) in FIG. 2A are subsequently taken as target samples, the amplitude patterns thereof become patterns (2), (3), . . . , (7) in FIG. 2B, and "+011", "−001" . . . "+001" corresponding to their correction values +0.37, −0.14, . . . , +0.14 are respectively added to the lower of the LSBs of the samples (2), (3), . . . , (7).

Figure 3:
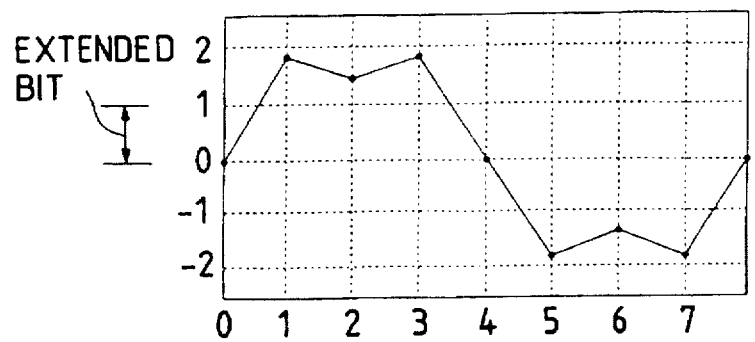
FIG. 3 is a diagram showing the corrected digital data.

As a result of this operation, the sample values of the digital data train shown in FIG. 2A are corrected into reproduced digital data whose rounding errors have been removed as shown in FIG. 3. Such reproduced digital data is D/A-converted through a filter or the like, so that such a correct original waveform as shown in FIG. 1A can be reproduced.

To find a relationship between the respective amplitude patterns and the correction values from quantization errors, CD (compact disk) data in which musical data obtained from a natural musical instrument is recorded in digital form is examined. CD data is generally quantized using a 16-bit code. If the amplitude level of the recorded signal were reduced by 24 dB, the 4 less significant bits of the original digital data would be dropped, and these 4 bits would become a quantizing error. Considering this, the relationship between the amplitude patterns of the data of the 12 more significant bits and the quantizing errors of the 4 less significant bits is examined for a plurality of CDs.

Figure 4A:
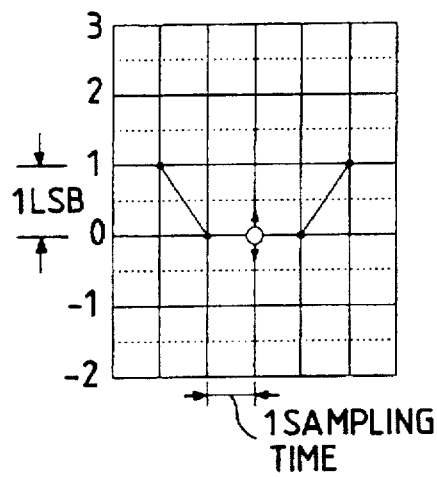
FIGS. 4A to 4C are diagrams showing a relationship among the amplitude pattern, the quantizing error distribution in such amplitude pattern, and the optimal correction value.
Figure 4B:
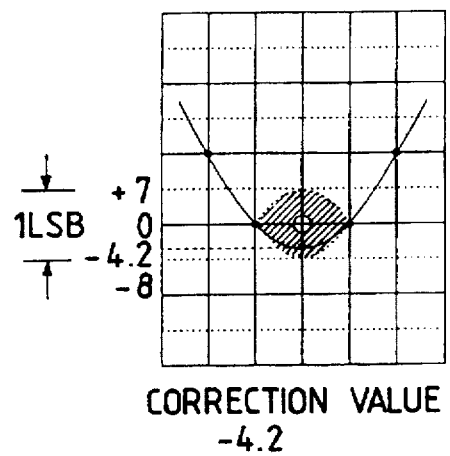
Figure 4C:
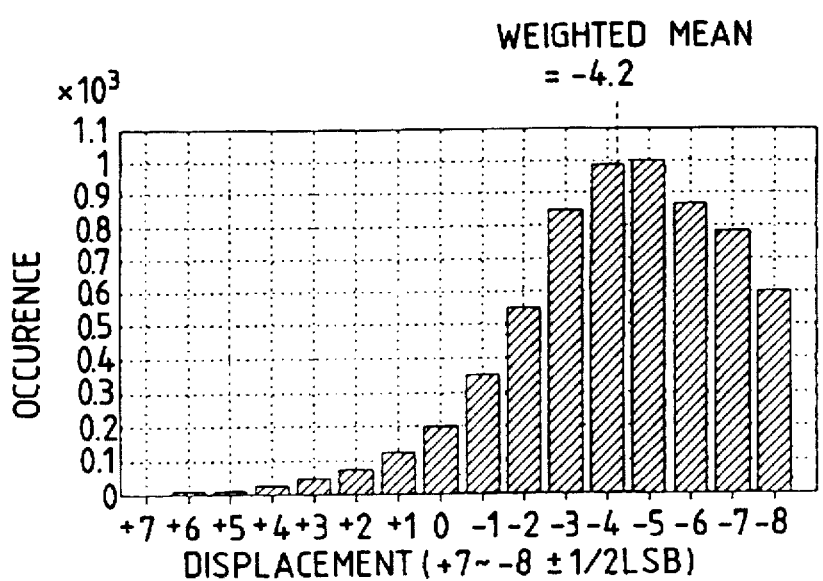

The quantizing error of a target sample was checked with respect to all the sampled data trains whose amplitude pattern becomes [1, 0, 0, 0, 1] as shown in FIG. 4A. Then, the ±½ LSB range of the target sample is divided by 16 from −8 to 7 subranges, and to which subrange each quantizing error belongs was checked. The results are shown in the form of histogram of FIG. 4C. As is apparent from this histogram, a specific amplitude pattern exhibits a specific distribution in terms of the quantizing error of a target sample. In the case of this embodiment, −4.2 is determined as the correction value of this amplitude pattern from the weighted mean of the histogram. Using this correction value, the target sample is corrected to a position at which the sampled data train can be connected most smoothly out of the hatched range of possible corrected positions as shown in FIG. 4B. It should be noted that the maximum frequency may be taken as the correction value other than taking the weighted mean value as in this embodiment.

It is in this way that the relationship among the amplitude patterns, the correction values, and the occurrence frequencies is found as shown in FIG. 5.

Figure 6A:
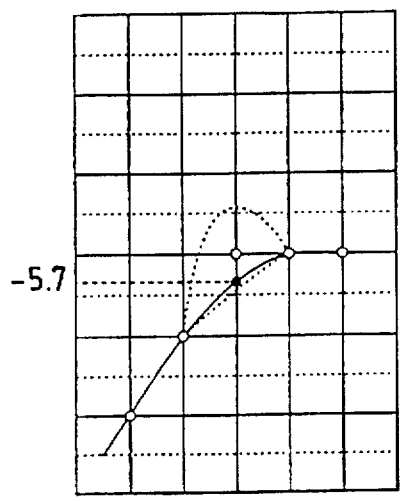
FIGS. 6A and 6B are diagrams showing a relationship among the amplitude pattern, the quantizing error distribution in such amplitude pattern, and the optimal correction value.
Figure 6B:
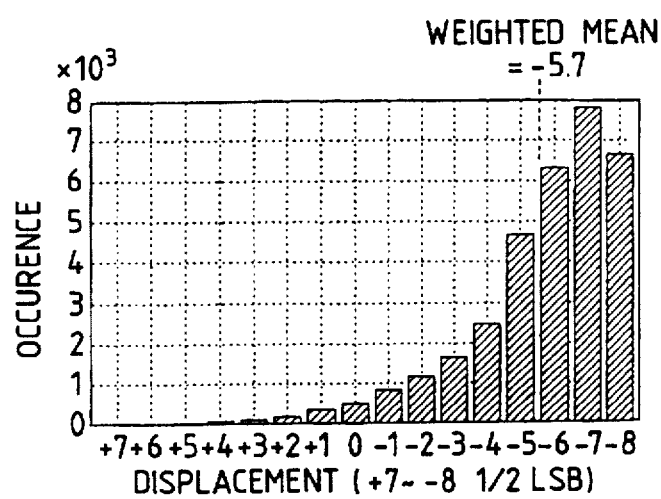
Figure 7A:
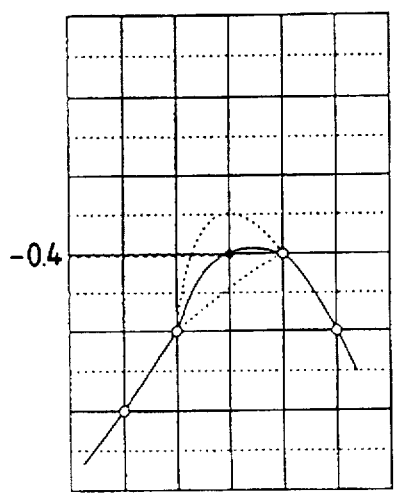
FIGS. 7A and 7B are diagrams showing a relationship among the amplitude pattern similar to that of FIG. 6, the quantizing error distribution in such amplitude pattern, and the optimal correction value.
Figure 7B:
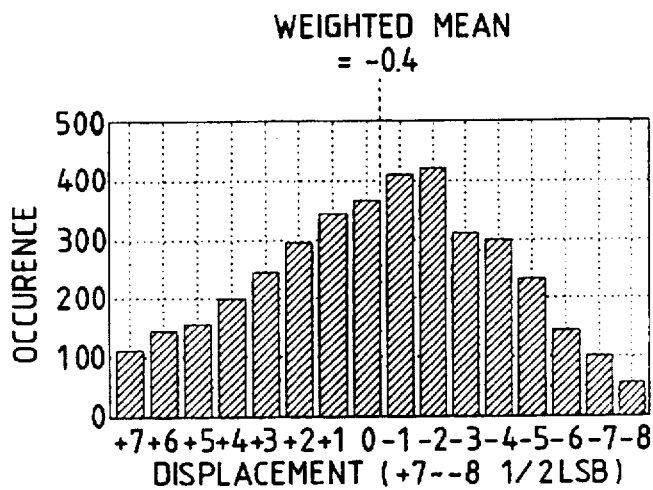

It should also be noted that too small a number of samples constituting an amplitude pattern does not ensure accurate error correction. For example, comparing an amplitude pattern [−2, −1, 0, 0, 0] shown in FIG. 6A with an amplitude pattern [−2, −1, 0, 0, −1] shown in FIG. 7A, only a difference of a single LSB exists between the fifth samples. However, in terms of the quantizing error distribution, both amplitude patterns exhibit completely different distributions as shown in FIGS. 6B and 7B, which in turn makes the correction values to be found also completely different.

On the other hand, too large a number of samples constituting an amplitude pattern increases the number of patterns to be prepared. Therefore, from these considerations, it is preferred to set the number of samples per amplitude pattern to the order of 5 to 20.

In addition, the sampled data train constituting an amplitude pattern may not necessarily be continuous as in the aforementioned embodiment, but may be a data train arranged at an interval of n samples ("n" is a natural number). The latter data train is effective in correcting low-frequency signals in which data of comparatively equal level succeed.

Moreover, the sampled data train constituting an amplitude pattern may be a data train arranged at unequal intervals instead of being a data train either continuous or at equally spaced intervals. For example, the unequally spaced sampled data train may be arranged in such a manner that a target sample is followed by samples interposing the target sample, which are then followed by samples that are two samples away from the target sample. Such sampled data train is not only effective in correcting low-frequency signals in which data of comparatively equal level succeed but also advantageous in grasping a tendency of change in the sampled data train in a substantially wide range with a small number of samples. However, it is desirable to use samples before and after the target sample since the sample closest to the target sample (the point to be found) is most important.

Figure 8:
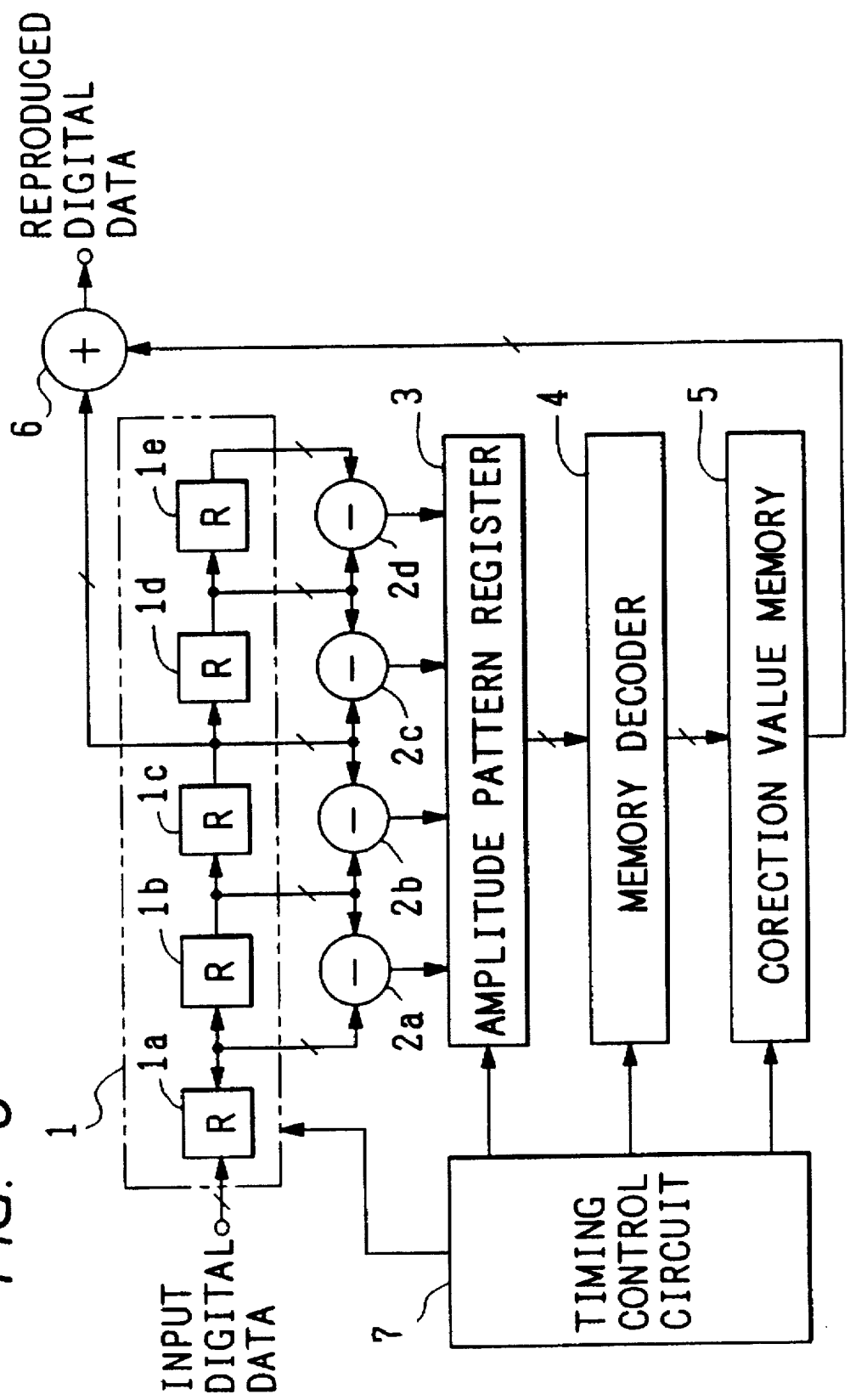
FIG. 8 is a block diagram showing a configuration of a digital data reproducing apparatus, which is an embodiment of the invention.

FIG. 8 is a block diagram showing a configuration of a digital data reproducing apparatus, which is an embodiment of the invention based on the aforementioned concept.

This apparatus is arranged upstream with respect to a D/A converter and reproduces digital data that is to be supplied to the D/A converter into a waveform close to an original waveform in advance.

For example 16-bit digital data consisting of an original sampled data train is inputted to a 5-stage shift register 1 that stores 5 continuous samples. The samples are sequentially shifted to respective stages $1a$, $1b$, ..., $1e$. A sample that is stored in the third stage $1c$ is the target sample. The outputs of adjacent stages of the shift register 1 are inputted to each of subtractors $2a$, $2b$, $2c$, $2d$, and amplitude pattern data in a form of the relative expression is outputted from each of the subtractors $2a$ to $2d$. The output of each of the subtractors $2a$ to $2d$ is stored in an amplitude pattern register 3. The shift register 1, subtractors $2a$ to $2d$, and amplitude pattern register 3 constitute an amplitude pattern extracting means for extracting amplitude patterns from the inputted digital data.

A memory decoder 4 outputs an address of a correction value memory 5 in which a correction value corresponding to the inputted amplitude pattern data is stored. The memory decoder 4 has addresses of the correction value memory 5 corresponding to all the amplitude patterns. The correction value memory 5 stores all kinds of correction values, each correction value being composed of, e.g., 3 bits and a sign bit. It should be noted that the correction value memory 5 may be omitted if the correction values corresponding to the patterns are stored in the memory decoder 4.

The 16-bit target sample stored in the third stage $1c$ of the shift register 1 and the 3-bit correction value outputted from the correction value memory 5 are extended to 19 bits by adding the correction value to the right of the LSB of the target sample by an adder 6. As a result of this operation, reproduced digital data whose quantizing error is reduced is outputted from the adder 6, and this output is then supplied to the D/A converter at a subsequent stage.

It should be noted that a timing control circuit 7 controls the processing timing at the aforementioned respective sections.

This embodiment, finding a correction value by a table-look-up technique, can process data on a realtime basis. In addition, because relatively expressed data is used as the amplitude pattern, the amplitude pattern data becomes independent of the amplitude level of the target sample, which in turn allows the number of combinations of patterns to be stored in the memory decoder to be reduced.

Figure 9:
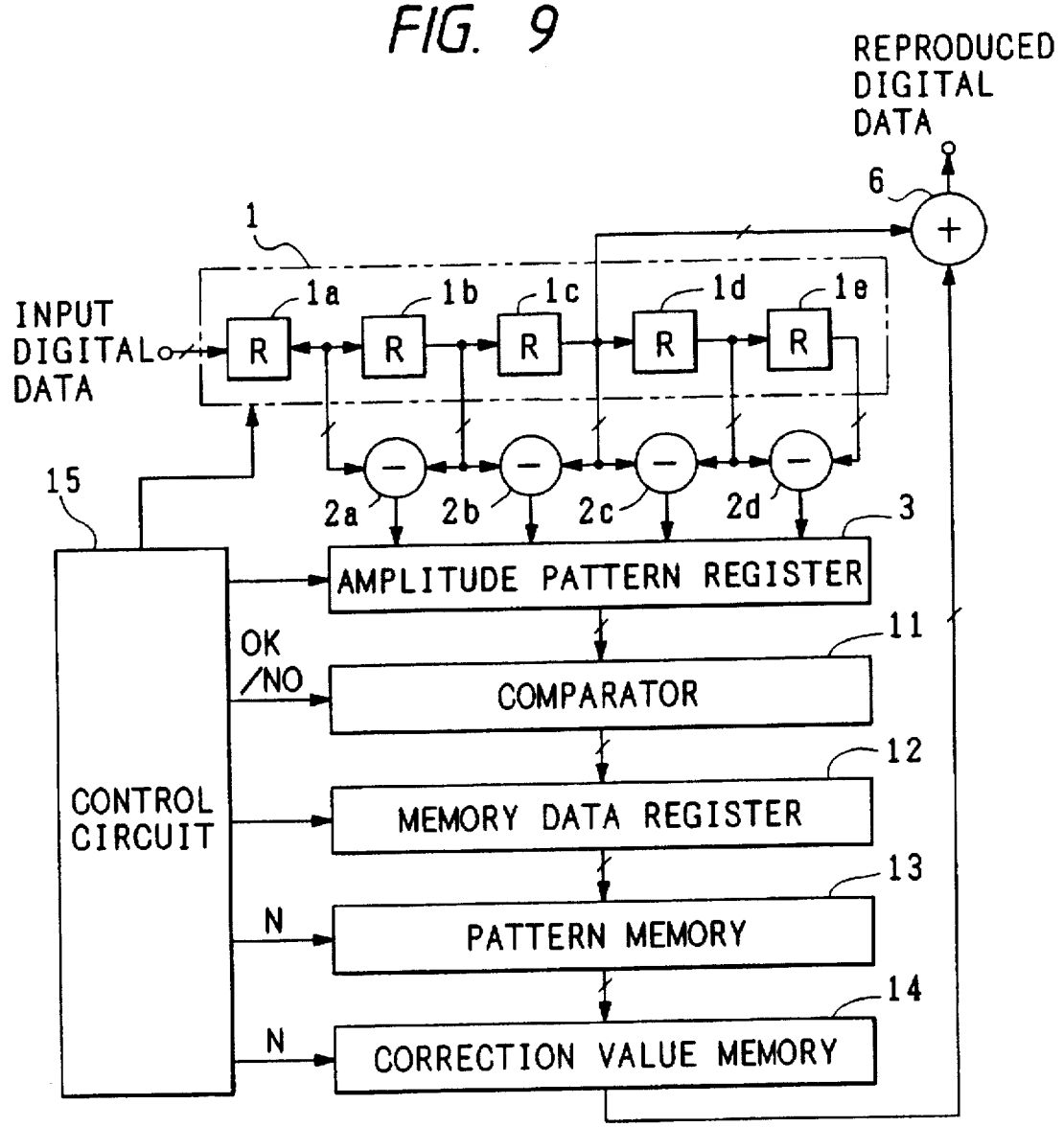
FIG. 9 is a block diagram showing a configuration of a digital data reproducing apparatus, which is another embodiment of the invention.

FIG. 9 is a block diagram showing a configuration of a digital data reproducing apparatus, which is another embodiment of the invention.

This embodiment is distinguished from the aforementioned embodiment in the design of the correction value output means. In this embodiment the correction value output means includes: a comparator 11, a memory data register 12, a pattern memory 13 and a correction value memory 14.

Figure 10:
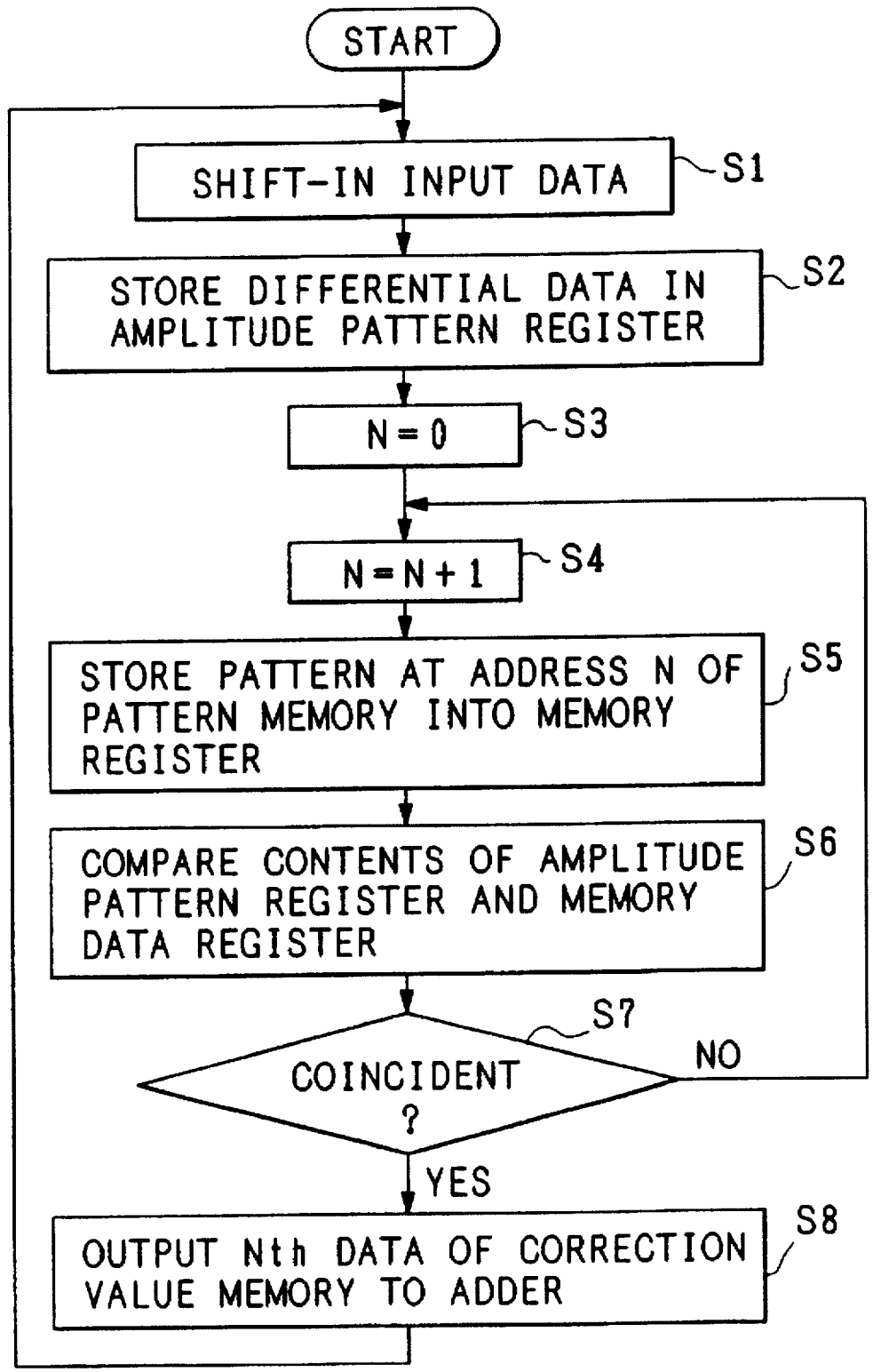
FIG. 10 is a flowchart showing an operation of the apparatus of FIG. 9.

FIG. 10 is a flowchart showing an operation of the apparatus of FIG. 9.

First, 5 samples to be processed are set to the shift register 1 by feeding and shifting inputted digital data sample by sample (S1). Then, amplitude pattern data is latched in the amplitude pattern register 3 (S2).

The amplitude pattern data supplied from the amplitude pattern register 3 is fed to the comparator 11 as one of inputs of the comparator 11. Amplitude pattern data read from the pattern memory 13 and stored in the memory register 12 is given as the other input of the comparator 11 (S5). A control circuit 15 sequentially supplies pattern memory 13 reading addresses from the start to the end (S3, S4). The comparator 11 sets a control circuit 15 OK/NO flag upon coincidence of both amplitude patterns. The control circuit 15 then reads a correction value from the same correction value memory 14 address as the pattern memory 13 address at which the patterns coincided with each other, and the read data is supplied to the adder 6 (S7, S8). As a result of this operation, the sampled data are corrected.

While this embodiment involves an amplitude pattern searching operation, pattern searching efficiency can be improved by storing the amplitude patterns in the pattern memory 13 in an order that is based on pattern occurrence frequency as shown in FIG. 5.

While the relatively expressed patterns are used as the amplitude pattern in the aforementioned embodiments, the absolutely expressed patterns may be used as well.

Figure 11:
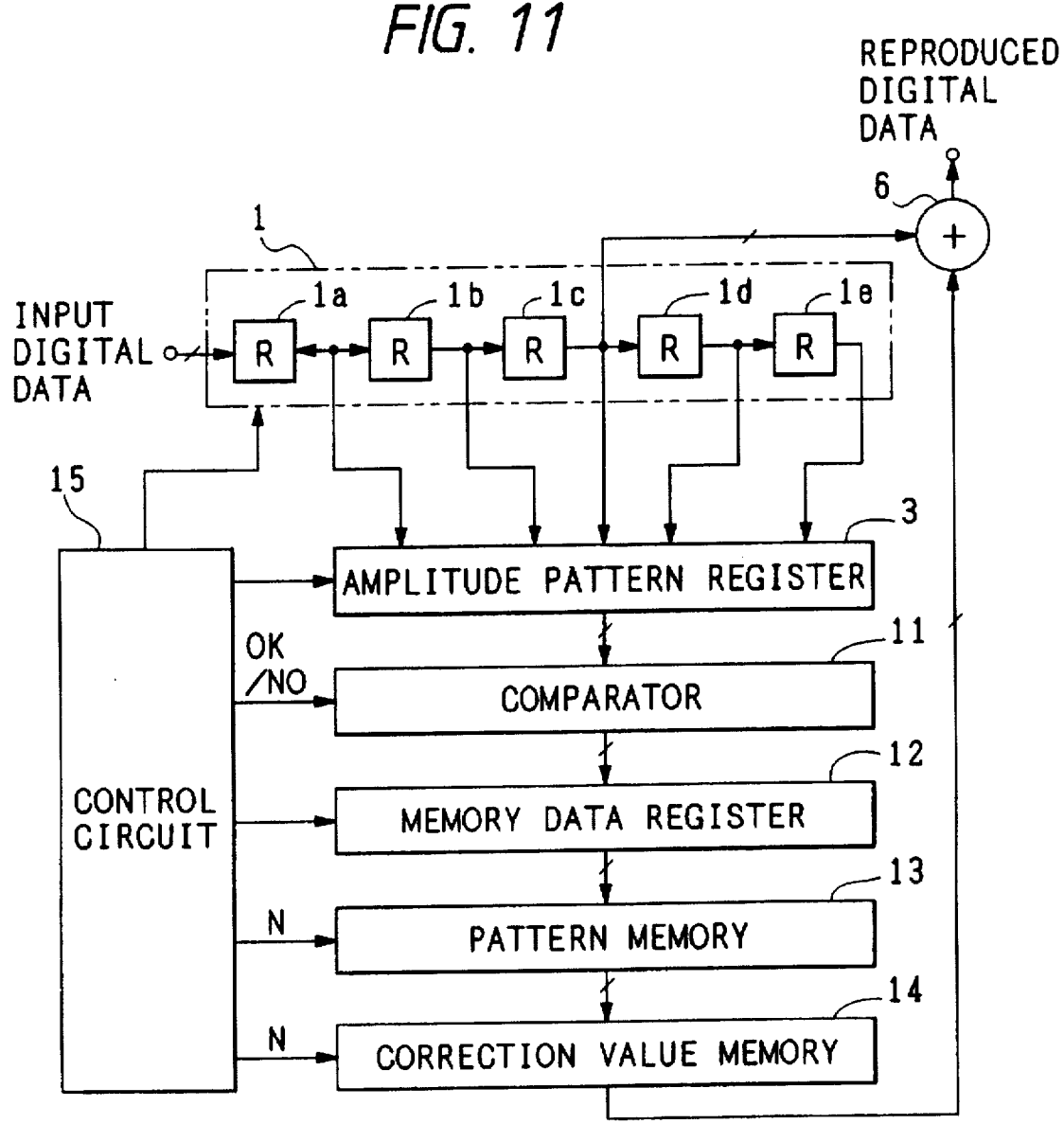
FIG. 11 is a block diagram showing a configuration of a digital data reproducing apparatus, which is still another embodiment of the invention.
Figure 12A:
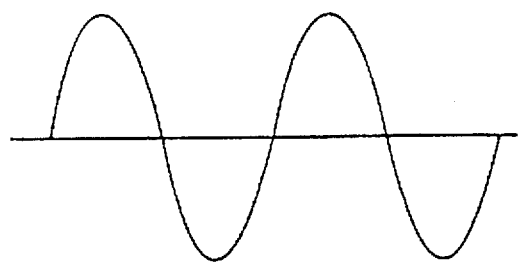
FIG. 12A to 12C are diagrams illustrative of effects of quantizing errors.
Figure 12B:
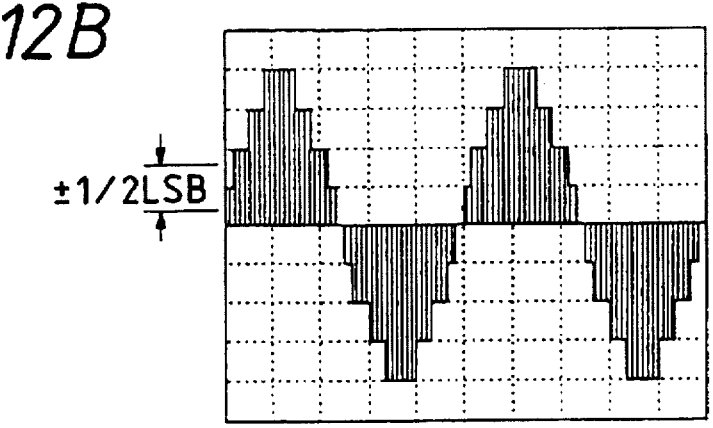
Figure 12C:
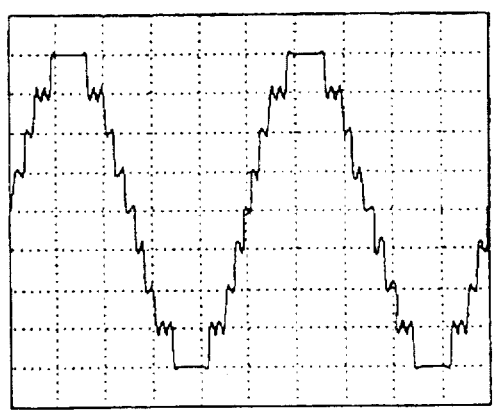

FIG. 11 shows an embodiment in which absolutely expressed patterns are used. The subtractors $2a$ to $2d$ are omitted, and an input sampled data train is directly stored in the amplitude pattern register 3. While the number of kinds of patterns is increased in this embodiment, the advantages of the invention are fully obtained.

As described in the foregoing, the invention is characterized as storing a relationship between an amplitude pattern composed of a predetermined number of samples including a target sample and a correction value corresponding to a quantizing error of such target sample in advance, and calculating correction values of respective samples of inputted digital data from the amplitude pattern. As a result of this technique, each piece of sampled data can be finely corrected, which in turn allows quantization noise to be reduced effectively.

The invention is further characterized as allowing correction values to be prepared for all possibly expected amplitude patterns. As a result, sampled data can be corrected for a wide variety of amplitude patterns.

What is claimed is:

1. A method of reproducing digital data, comprising steps of:

obtaining a relationship between an amplitude pattern composed of a train of a predetermined number of samples including a target sample and a correction value corresponding to a quantizing error of the target sample in advance from a relationship between a plurality of samples of the same amplitude pattern and actual amplitude values of target samples thereof;

obtaining a correction value of each of samples of an input digital data based on said amplitude pattern; and adding said correction value to the LSB of each piece of the inputted digital data, whereby digital data with reduced quantizing error can be reproduced.

2. The method of reproducing digital data as claimed in claim 1, wherein a number of said samples of said amplitude pattern is in a range from 5 to 20.

3. The method of reproducing digital data as claimed in claim 1, wherein said samples of said amplitude pattern are continuous data.

4. The method of reproducing digital data as claimed in claim 1, wherein said samples of said amplitude pattern are arranged at equal intervals, and said samples.

5. The method of reproducing digital data as claimed in claim 1, wherein said samples of said amplitude pattern are arranged at unequal intervals, and said samples include at least samples before and after the target sample.

6. The method of reproducing digital data as claimed in claim 1, wherein said relationship between the amplitude pattern and a correction value is obtained in such a manner that the quantizing error of the target sample is actually measured, and a distribution of the quantizing error is statistically analyzed.

7. A digital data reproducing apparatus comprising:

a means for extracting an amplitude pattern composed of a train of a predetermined number of samples including a target sample from inputted digital data;

a means for outputting a correction value by inputting the amplitude pattern extracted by the amplitude pattern extracting means, and outputting a correction value corresponding to the inputted amplitude pattern based on a relationship between the amplitude pattern and a correction value corresponding to a quantizing error of the target sample obtained in advance from a relationship between a plurality of samples of the same amplitude pattern and actual amplitude values of target samples thereof; and a means for correcting the target sample by adding the correction value outputted from the correction value outputting means to the right of the LSB of the target sample of the inputted digital data.

8. A digital data reproducing apparatus comprising:

a shift resister of a predetermined number of states which stores an amplitude pattern composed of a predetermined number of samples including a target sample from input digital data;

an amplitude pattern register which stores a content of said shift register;

a correction value memory in which a correction value for different amplitude patterns are stored; and a timing control circuit which controls processing timing, wherein one of the correction values is read out from the correction value memory based on the amplitude pattern stored in the shift register.

9. A digital data reproducing apparatus as claimed in claim 8, further comprising a memory decoder which stores an address of said correction value memory corresponding to the amplitude pattern data therein.

10. A digital data reproducing apparatus as claimed in claim 8, further comprising a plurality of subtractors, each subtractor being connected to two adjacent stages of said shift register to output a difference as an amplitude pattern in a form of a relative expression.

11. A digital data reproducing apparatus comprising:

a shift register of a predetermined number of states which stores an amplitude pattern composed of a predetermined number of samples including a target sample from input digital data;

an amplitude pattern register which stores a content of said shift resister;

a correction value memory in which a correction value corresponding to the amplitude pattern is stored;

a pattern memory in which patterns data of an amplitude pattern data to be compared are stored, the amplitude pattern data being stored at an address of the pattern memory;

a comparator, amplitude pattern data stored in said amplitude pattern register being fed to one input of said comparator, and amplitude pattern data read from said pattern memory being fed to the other input; and a control circuit, wherein when the inputs of said comparator coincide with each other, a correction value is read out from the correction value memory, the correction value being read out from the same address as the address of the pattern memory.

12. A digital data reproducing apparatus as claimed in claim 11, further comprising a memory decoder which stores an address of said correction value memory corresponding to the amplitude pattern data therein.

13. A digital data reproducing apparatus as claimed in claim 11, further comprising a plurality of subtractors, each subtractor being connected to two adjacent stages of said shift register to output a difference as an amplitude pattern in a form of a relative expression.

14. The digital data reproducing apparatus as defined in claim 8, further comprising an adder for adding the correction value read out from the correction value memory to the target sample.

15. The digital data reproducing apparatus as defined in claim 8, further comprising a circuit for adding the correction value read out from the correction value memory to the right of the LSB of the target sample.

16. The digital data reproducing apparatus as defined in claim 11, further comprising an adder for adding the correction value read out from the correction value memory to the target sample.

17. The digital data reproducing apparatus as defined in claim 11, further comprising a circuit for adding the correction value read out from the correction value memory to the right of the LSB of the target sample.

* * * * *